(12) United States Patent
Weise et al.

(10) Patent No.: US 7,007,552 B2
(45) Date of Patent: Mar. 7, 2006

(54) MULTI-CHANNEL PRESSURE SENSING APPARATUS

(75) Inventors: Peter A. Weise, Attleboro, MA (US); Thomas R. Maher, Rehoboth, MA (US)

(73) Assignee: Texas Instruments Incorporated, Dallas, TX (US)

( * ) Notice: Subject to any disclaimer, the term of this patent is extended or adjusted under 35 U.S.C. 154(b) by 22 days.

(21) Appl. No.: 10/898,769

(22) Filed: Jul. 26, 2004

(65) Prior Publication Data

US 2006/0016266 A1    Jan. 26, 2006

(51) Int. Cl.
*G01L 9/00*   (2006.01)

(52) U.S. Cl. ........................................ 73/754
(58) Field of Classification Search ................. 73/700, 73/753
See application file for complete search history.

(56) References Cited

U.S. PATENT DOCUMENTS

| | | | |
|---|---|---|---|
| 4,471,786 A * | 9/1984 | Inagaki et al. ............... | 600/561 |
| 5,116,331 A * | 5/1992 | Chapman ..................... | 73/721 |
| 5,853,020 A * | 12/1998 | Widner ........................ | 137/227 |
| 6,199,575 B1 * | 3/2001 | Widner ........................ | 137/227 |
| 6,247,369 B1 * | 6/2001 | Chapman et al. ............. | 73/726 |
| 6,318,181 B1 * | 11/2001 | Shimomoto et al. .......... | 73/709 |
| 6,453,747 B1 * | 9/2002 | Weise et al. .................. | 73/715 |
| 6,687,642 B1 | 2/2004 | Maher et al. | |
| 6,763,724 B1 * | 7/2004 | DiPaola et al. ............... | 73/717 |
| 6,782,758 B1 * | 8/2004 | Weise .......................... | 73/756 |

OTHER PUBLICATIONS

U.S. Appl. No. 10/743,363 filed Dec. 22, 2003 Entitled Variable Condition Responsive Sense System and Method Inventors: Thomas R. Maher, David L. Corkum.

* cited by examiner

*Primary Examiner*—Edward Lefkowitz
*Assistant Examiner*—Andre Allen
(74) *Attorney, Agent, or Firm*—Russel E. Baumann; Frederick J. Telecky, Jr.

(57) ABSTRACT

A multi-channel pressure sensor module (10) for integration in a hydraulic/electrical control unit of a vehicular braking system is shown. A body or manifold (16) mounts a plurality of strain gauge sense element assemblies (12) each having a port for connection to a fluid pressure source to be monitored. An electronic module assembly (14) has a contact printed circuit board (24) and a sense element printed circuit board (22) sandwiching a spacer/support member (20) and electrically coupled together by a flexible circuit board (26). The spacer/support member (20) is formed with pockets (20e, 20f) for receipt of discrete electronic components and to provide access to wire bond pads (22c) and sense element openings (22b). First and second sets of guide posts (20c, 20d) extend from the spacer/support member for alignment of the circuit boards as well as the electronic module assembly on the base. A cover (18) is received on the base over the electronic module assembly and provides access to contact pads of the contact printed circuit board through a shroud (18d).

7 Claims, 7 Drawing Sheets

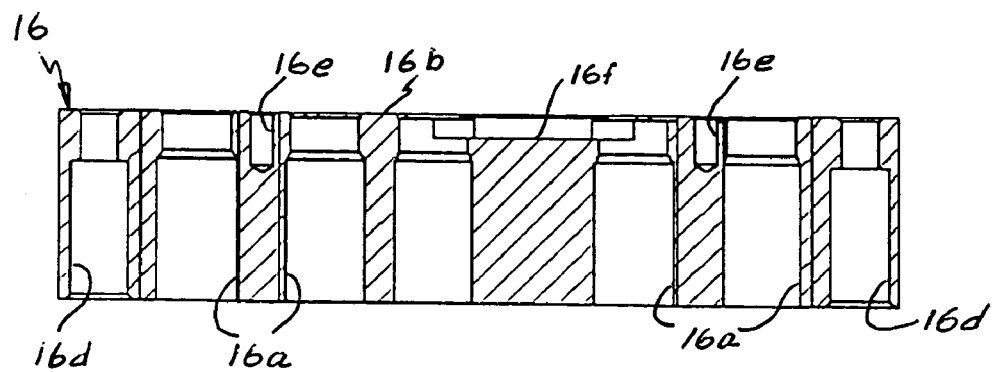
FIG 4
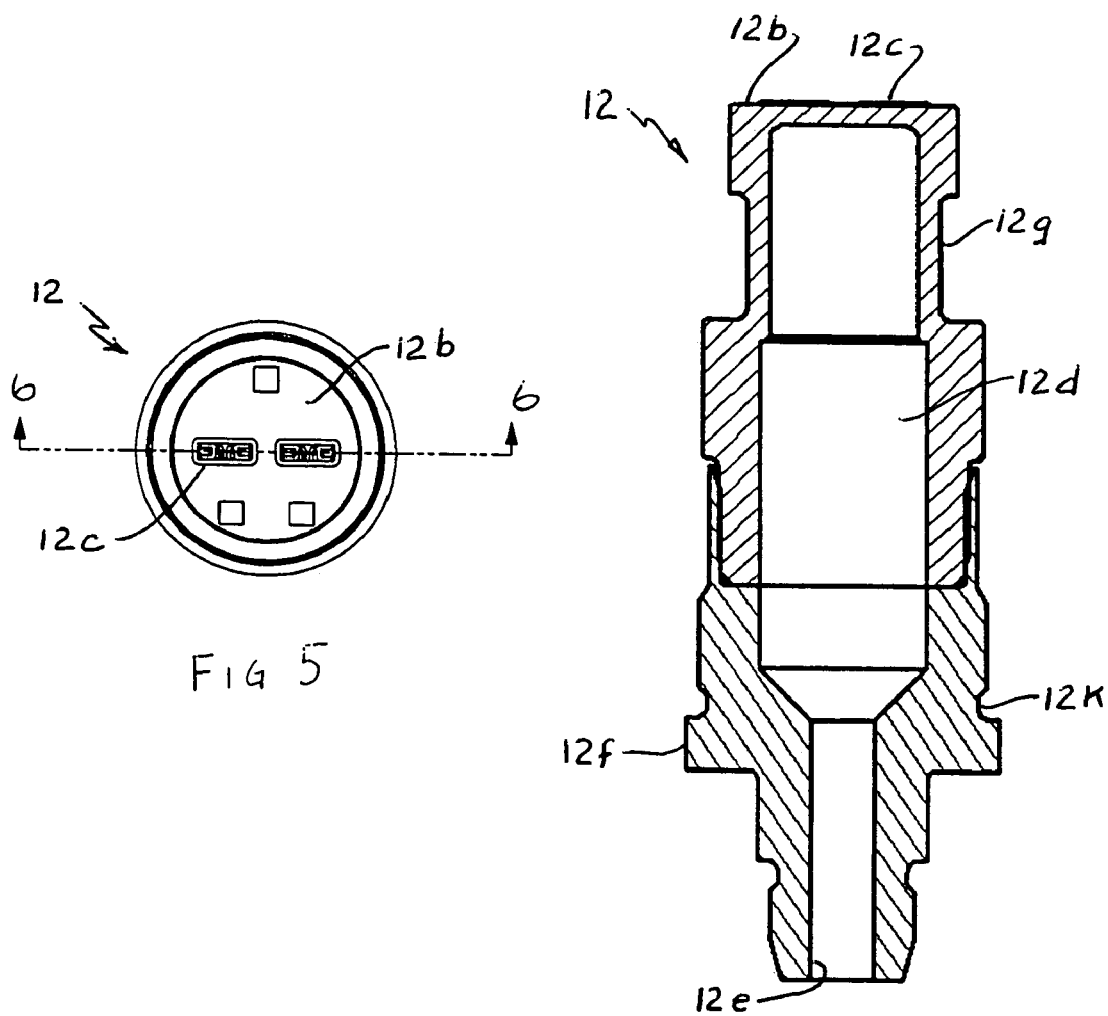
FIG 5
FIG 6

MULTI-CHANNEL PRESSURE SENSING APPARATUS

FIELD OF THE INVENTION

This invention relates generally to apparatus for sensing fluid pressure of a plurality of pressure sources, and more particularly to a multi-channel pressure sensing module for use in a hydraulic and electrical control unit of a vehicular braking system.

BACKGROUND OF THE INVENTION

Many applications call for the sensing of pressure at a plurality of locations. By way of example in the vehicular environment, electro-hydraulic brake systems often have a plurality of different locations that sense fluid pressure. For example, pressure sensing at each wheel for closed loop brake force control, at a location to sense driver input and, if desired, at a pressure accumulator to sense systems reserve pressure. Hydraulic sensing points are all routed through the hydraulic/electrical control unit or HECU having a system controller, i.e., microprocessor, to process the inputs provided by the different hydraulic circuit pressures. The provision of discrete pressure sensors with full conditioning electronics results in suitable operation, however, it also results in a relatively high total pressure sensor cost as well as significant spatial requirements.

In co-assigned U.S. Pat. No. 6,687,642 which issued Feb. 3, 2004, and copending application Ser. No. 10/743,363 filed Dec. 22, 2003, condition responsive systems are described and claimed in which the outputs of a plurality of condition responsive sense elements are processed by an electronic circuit and provided to an external system controller for use in a HECU system.

SUMMARY OF THE INVENTION

It is an object of the invention to provide apparatus for packaging a plurality of sense elements and associated electronics in a module so that the footprint or space required for the module is minimized as well as minimizing the cost per channel compared to the space and cost when individual sensors are used. Another object of the invention is the provision of a multi-channel pressure sensing module which is reliable, robust and long lasting which is readily integratable in a hydraulic/electrical control unit of a brake system for interconnection with a host controller through a communications bus such as a SPI bus.

Briefly, a multi-channel pressure sensing module made in accordance with a preferred embodiment of the invention comprises four main subassemblies or components including an elongated base or manifold which mounts a plurality of sense element assemblies in spaced apart bores extending through the base.

Each sense element assembly includes a tubular body having a pressure sensitive diaphragm closing one end thereof and a port fitting at the opposite end adapted for connection to a respective fluid source whose pressure is to be monitored. Strain gauges are mounted on the outer surface of the diaphragm.

An electronic module assembly is received on the top surface of the base and includes a spacer/support member sandwiched by a contact printed circuit board (pcb) and a sense element printed circuit board (pcb). The peripheral configuration of the electronic module assembly generally conforms to the peripheral configuration of the upper surface of the base while leaving a selected cover and adhesive receiving margin thereabout. The sense element pcb is provided with openings alignable with the respective sense element assemblies and has wire bond pads adjacent to the openings for wire bond connections. The sense element assemblies with the strain gauges and wire bond pads are aligned with open pockets formed in the spacer/support member. The contact pcb has a row of contact pads on a face surface facing away from the spacer/support member and discrete electronic components on the face surface facing the spacer/support member but aligned with the open pockets formed in the spacer/support member. The spacer/support member is provided with a first set of interference guide posts extending upwardly therefrom for receipt in respective guide holes in the contact pcb and a second set of guide posts extending downwardly therefrom for receipt in respective guide holes in the sense element pcb and top surface of the base for accurate positioning and retention of the respective contact pcb and positioning of the sense element pcb as well as the entire electronic module assembly relative to the base. The contact and sense element boards are electrically connected by a flexible circuit board which is bent back on itself in a generally U-shaped configuration about a shelf of the spacer/support member within the outer periphery of the contact and sense element pcbs. The spacer/support member and contact pcb are fixed to the base using conventional fastener means such as screw fasteners. A cover having a shroud surrounded opening aligned with the contact pads of the contact pcb is received on and staked to the base and is provided with a bead of adhesive material around the shroud which engages and holds the contact pcb. Additional adhesive is disposed on the peripheral margin of the base to form an environmental seal with the cover.

BRIEF DESCRIPTION OF THE DRAWINGS

The objects, advantages and novel features of the invention will be more fully apparent from the following description when read in connection with the accompanying drawings wherein:

FIG. 4 is an elevational cross sectional view similar to FIG. 3 but only of the base of the module;

FIG. 5 is a top plan view of a sense element assembly;

FIG. 6 is a cross sectional view taken on line 6—6 of FIG. 5;

DETAILED DESCRIPTION OF THE PREFERRED EMBODIMENT

Figure 1:
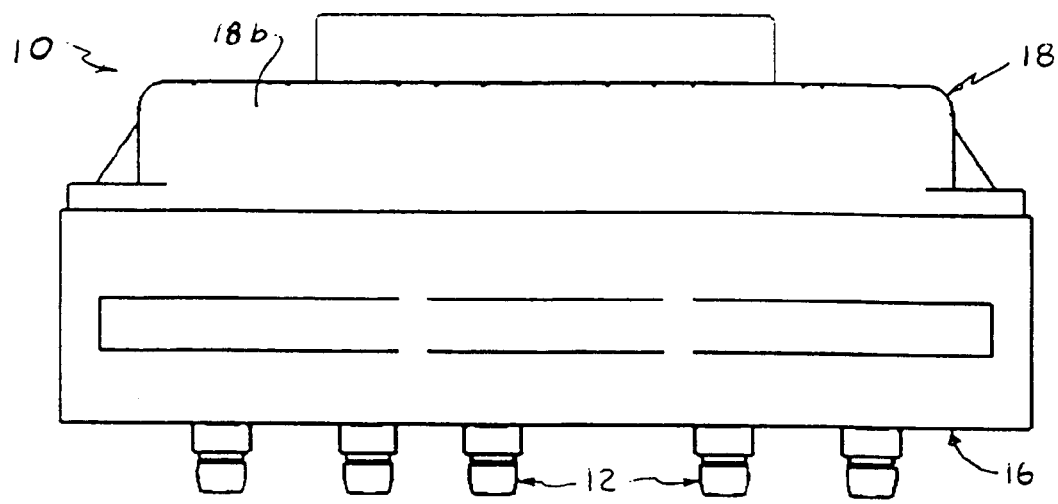
FIG. 1 is a front elevational view of a multi-channel pressure sensing module made in accordance with the invention.
Figure 2:
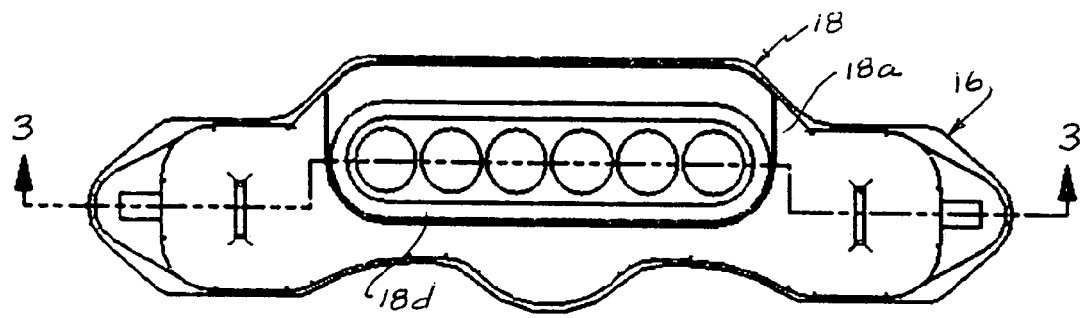
FIG. 2 is a top plan view of the FIG. 1 module.
Figure 3:
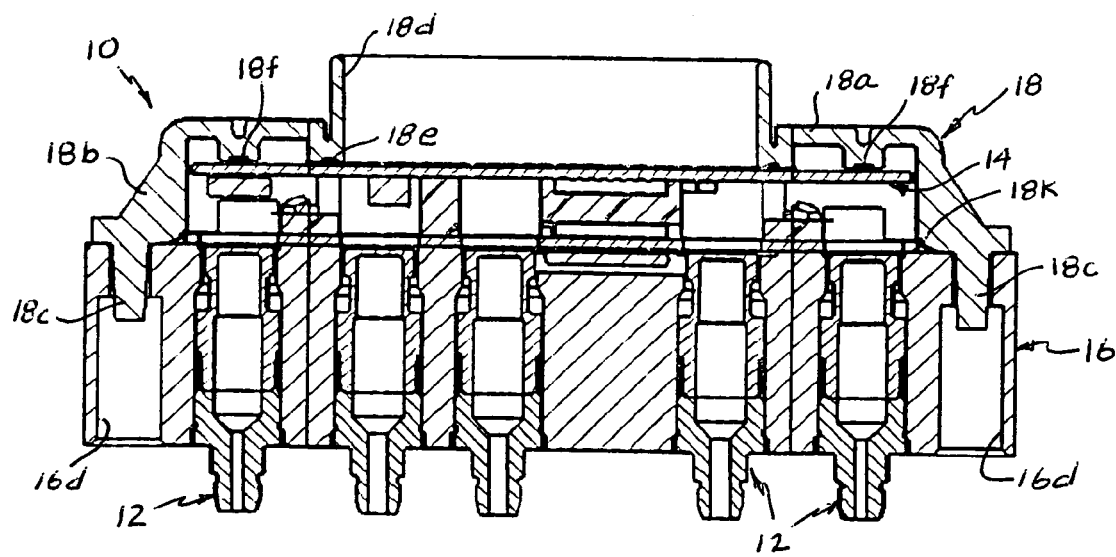
FIG. 3 is a cross sectional view taken on line 3—3 of FIG. 2.
Figure 7:
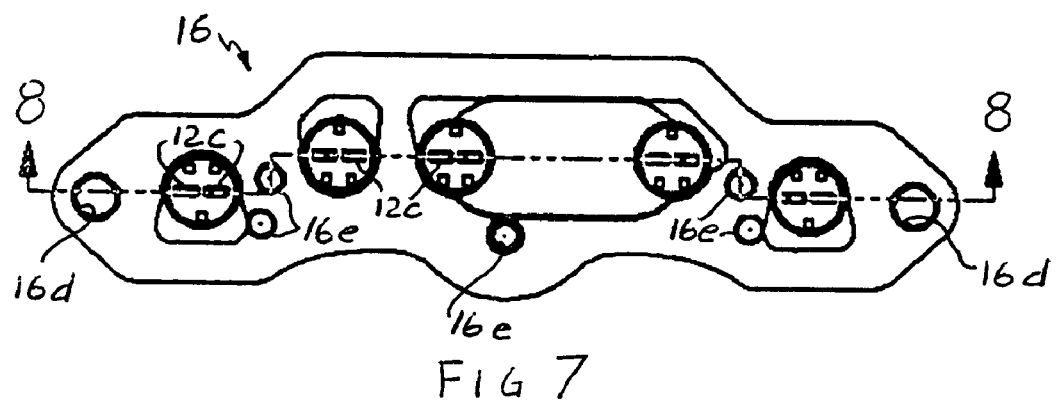
FIG. 7 is a top plan view of the base of the module with the sense element assemblies in place.

With reference to FIGS. 1–3, a multi-channel pressure sensing module 10 made in accordance with the invention comprises four basic portions including a sense element assembly 12, an electronic module assembly 14, a base or manifold 16 and a cover 18.

As shown in FIGS. 2 and 4, base 16 formed of suitable material, such as aluminum, is elongated and formed with a plurality of sense element receiving bores 16a extending between opposed face surfaces 16b, 16c. The bores preferably are formed with a first diameter portion communicating with face surface 16c and a smaller diameter portion communicating with face surface 16b and formed with a tapered transition therebetween. The tapered transition serves to facilitate the insertion of the leading edge of a sense element assembly and ensures that the assembly does not become caught on a ledge. The smaller bores on face surface 16b result in increased surface area providing more support for a circuit board, to be discussed.

A stepped bore 16d at opposite end portions of the base allow for alignment with assembly fixtures as well as an attachment means for cover 18 to be discussed. Several closed ended bores 16e are formed through face surface 16b for use in attaching a circuit board and to receive alignment posts of a spacer/support member to be discussed. An ASIC receiving recess 16f is also formed in face surface 16b.

Figure 8:
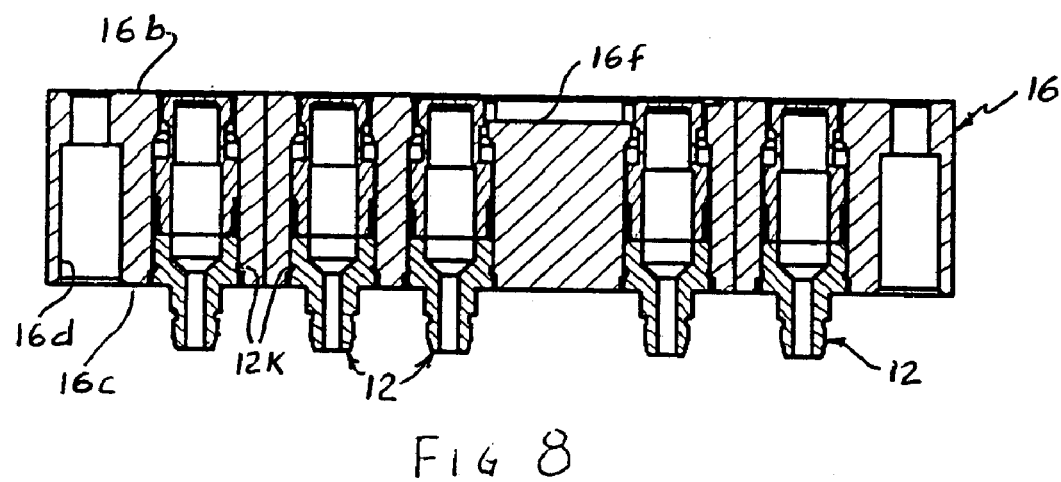
FIG. 8 is a cross sectional view taken on line 8—8 of FIG. 7.
Figure 9:
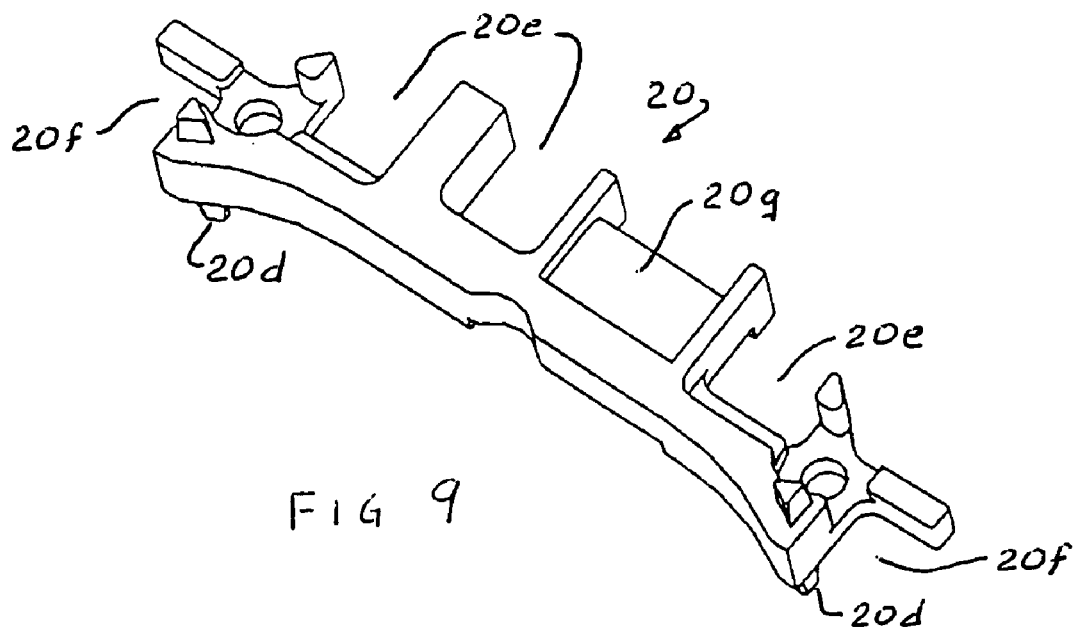
FIG. 9 is a perspective view of a spacer/support member of the electronics module assembly.
Figure 10:
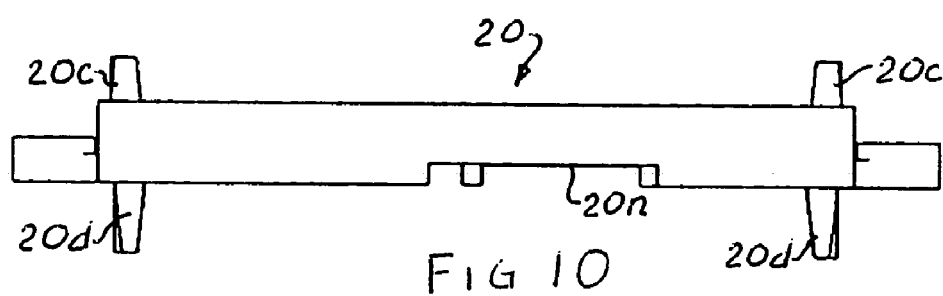
FIG. 10 is a front elevational view of the FIG. 9 spacer/support member.
Figure 11:
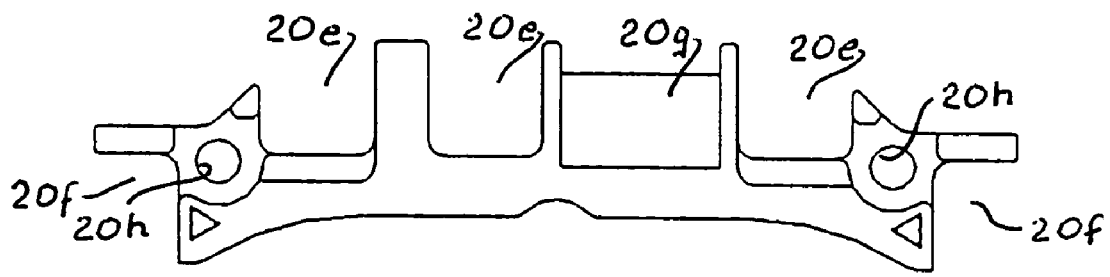
FIG. 11 is a top plan view of the FIG. 10 spacer/support member.
Figure 12:
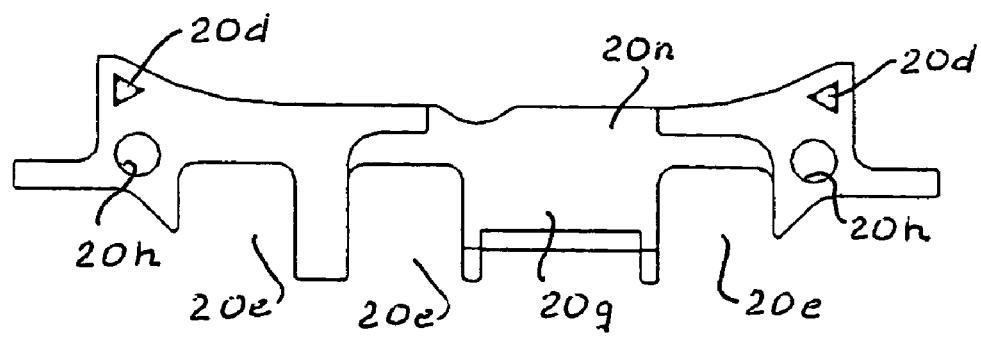
FIG. 12 is a bottom plan view of the FIG. 10 spacer/support member.

Sense element assemblies 12, shown best in FIGS. 5 and 6, each comprises a generally cylindrical pedestal formed of suitable material, such as stainless steel, has a cavity 12d therein. A head 12a is formed at one end with a generally planar diaphragm outer end surface 12b on which silicon strain gauges 12c are glass mounted in accordance with conventional techniques. The pedestal is provided with an opening 12e at an opposite end suitable for attachment to a fluid source, the pressure of which is to be monitored. With reference to FIGS. 6 and 8, the pedestal is preferably formed with a cylindrical flange portion 12f adjacent to the opening having a diameter slightly larger than that of bore 16a of the base so that when the cylindrical pedestal is inserted into a bore 16a, the harder material of the flange portion swages the softer aluminum of the base into and around the reduced diameter portion of gland 12k to form an effective seal without the need for an O-ring gasket or the like. The diameter of head 12a is selected so that it is spaced slightly from the side wall of smaller diameter portion of bore 16a. Further, as seen in FIG. 8, end surface 12b is axially spaced below face surface 16b of the base so that the strain gauges are also below face surface 16b and free of contact with a circuit board to be placed on face surface 16b. Preferably, a neck portion 12g having a reduced outer diameter and reduced wall thickness is provided for stress isolation between the body of the pedestal and head 12a.

Further details of a similar individual strain gauge pressure sensor can be found in U.S. Pat. No. 6,453,747, assigned to the assignee of the present invention, the subject matter of which is incorporated herein by this reference.

Electronic module assembly 14 is mounted on base 16 and comprises an elongated spacer/support member 20, FIGS. 9–12 and circuit boards 22–26, FIGS. 13–19. With particular reference to FIGS. 9–12, spacer/support member 20 is an elongated rib-like member formed of electrically insulative material and having a height selected to locate the contact pads, to be discussed, at a desired height above the base and to provide suitable electrical isolation between circuit boards 22, 24 mounted on opposite upper and lower surfaces thereof and components mounted on the boards. A first set of guide posts 20c extend upwardly from opposite ends of upper surface 20a and a second set of guide posts 20d extend downwardly from opposite ends of lower surface 20b. As shown, each set of guide posts comprises a pair which preferably are tapered and forms an interference fit with mating bores to optimize alignment. The posts may be formed with any desired configuration, such as the generally triangular cross sectional configuration shown in the drawings. Pockets 20e are formed on one elongated side and 20f are formed on the opposed elongated side in the spacer/support member open to the outer, top and bottom sides to provide clearance for discrete components mounted on the circuit boards. A guide way, including a laterally extending shelf 20g positioned intermediate to the top and bottom surfaces, is provided for flexible circuit 26, to be discussed. An attachment bore 20h is provided at a reduced thickness portion of spacer/support member at each opposite end.

Figure 13:
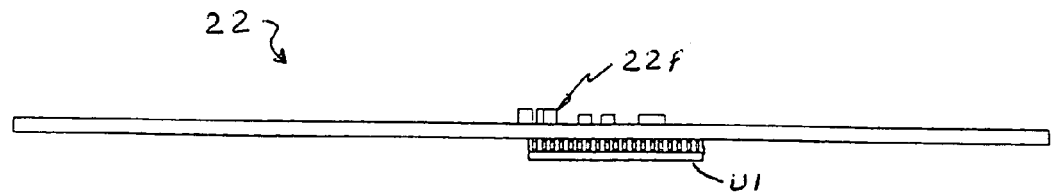
FIG. 13 is a front elevational view of the sense element printed circuit board (pcb)
Figure 14:
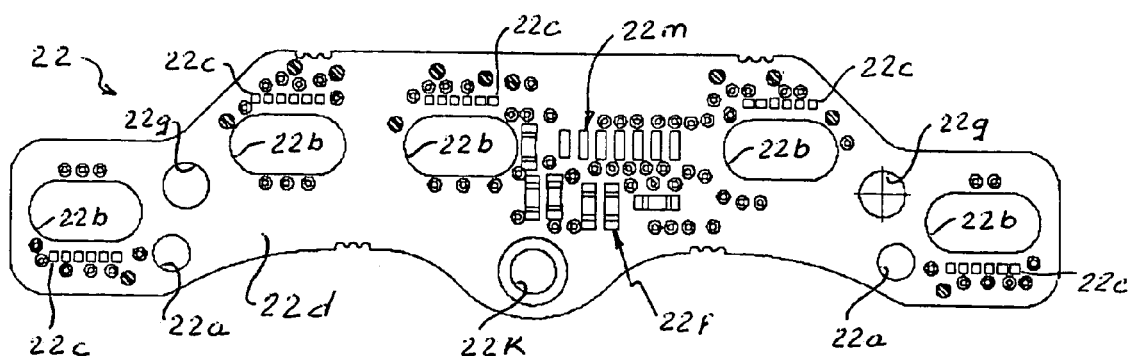
FIG. 14 is a top plan view of the FIG. 13 sense element pcb.
Figure 15:
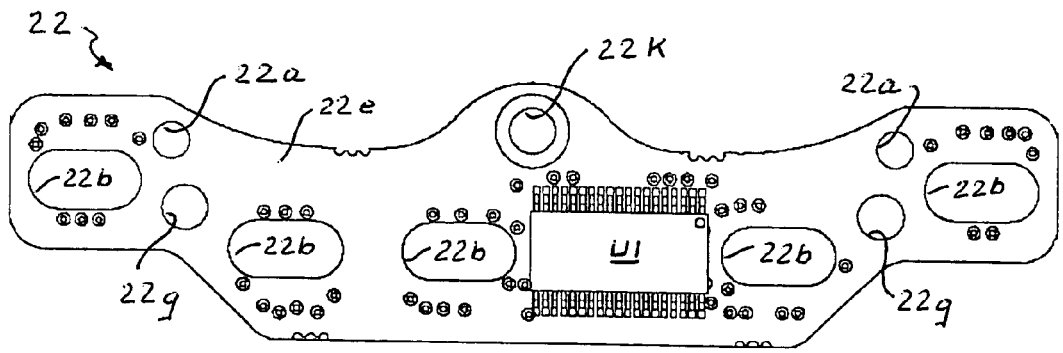
FIG. 15 is a bottom plan view of the FIG. 13 sense element pcb.

Elongated, relatively rigid sense element printed circuit board (pcb) 22, FIGS. 13–15, is formed with an alignment hole 22a adjacent each opposite end and with a somewhat elongated opening 22b for each respective sense element assembly and positioned to be alignable therewith. A series of sense element assembly wire bond pads 22c is positioned adjacent to each opening 22b on face surface 22d. A set of terminal pads 22m for interconnection with flexible circuit 26, to be discussed, is also positioned on face surface 22d at a generally central location between two openings 22b. Several discrete electronic components 22f are also disposed between the same two openings 22b on face surface 22d while on the opposite face surface 22e, an ASIC U1 is placed at a location which is alignable with recess 16f of base 16. A fixation hole 22g is formed adjacent each opposite end and alignable with holes 20h of spacer/support member 20 and two of bores 16e of base 16.

Face 22d of printed circuit board 22 is received on lower surface 20b of the spacer/support member with the second set of guide posts 20d received through guide holes 22a and consequently with each opening 22b and associated wire bond pads 22c and discrete electronic components aligned with a pocket 22e or 20f. The bottom surface of the rib is cut away at 20n at a location aligned with terminal pads 22m to provide a raised bottom surface which extends laterally in the form of a shelf 20g, to be discussed.

Figure 16:
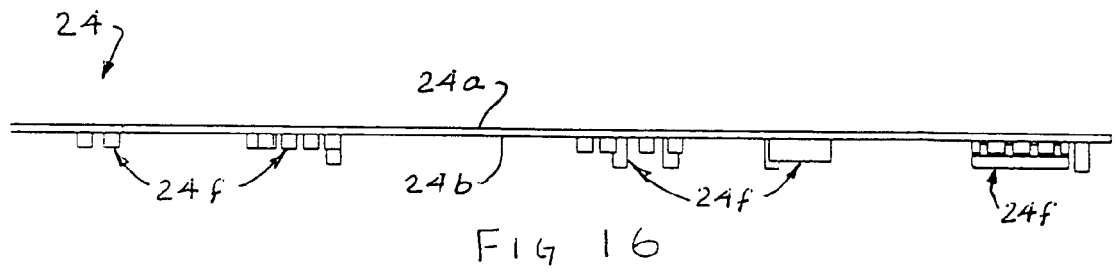
FIG. 16 is a front elevational view of the contact printed circuit board (pcb)
Figure 17:
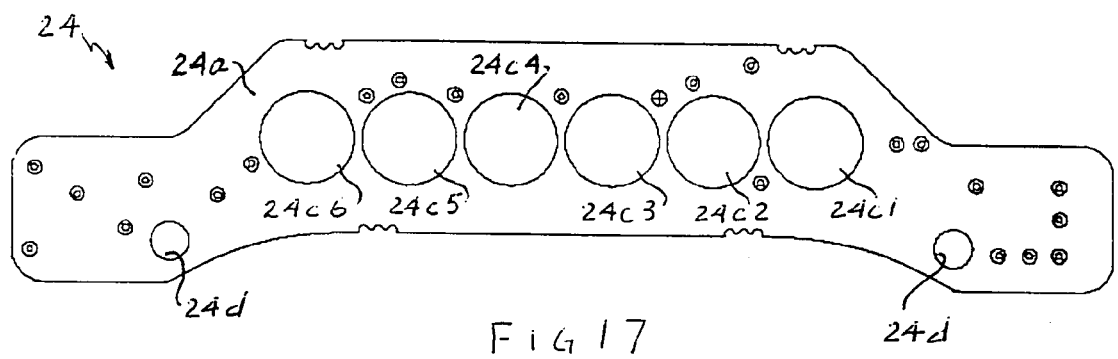
FIG. 17 is a top plan view of the FIG. 16 contact pcb.
Figure 18:
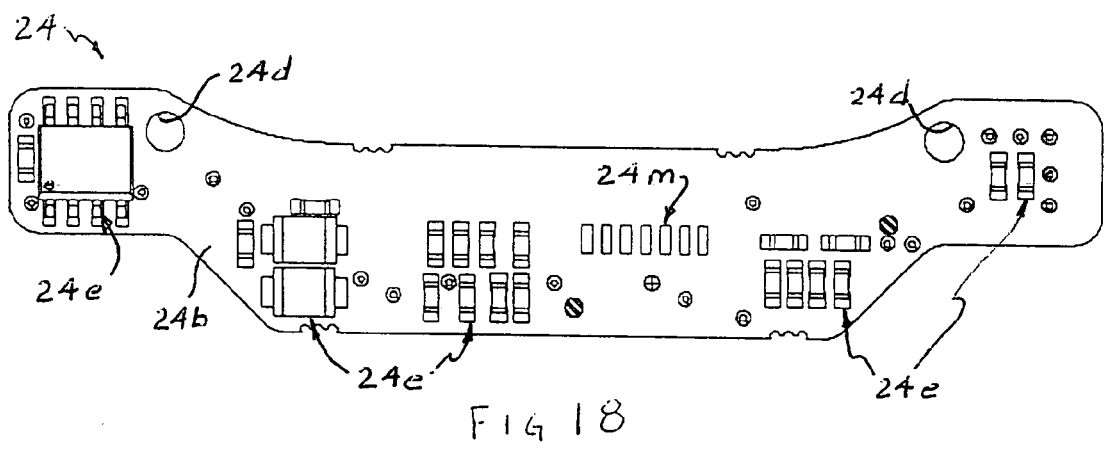
FIG. 18 is a bottom plan view of the FIG. 16 contact pcb.

A second elongated, relatively rigid contact printed circuit board (pcb) 24, FIGS. 16–18, having upper and lower face surfaces 24a, 24b, respectively, has a plurality of contact pads 24c1–24c6 aligned in a row in the center of face surface 24a. As noted above, the electronics employed in module 10 disclosed in detail in copending application Ser. No. 10/743, 363 has an SPI communications bus with four associated lines, a clock line (CLK), a chip select line (CS_N an inverted chip select), a slave input/master output (SIMO) and a slave output/master input (SOMI). Thus contact pads from 24c1 to 24c6, respectively, are dedicated to clock (CLK), slave input/master output (SIMO), inverted chip select (CS_N), slave output/master input (SOMI), power (PWR) and ground (GND). A guide hole 24d is formed through board 24 adjacent each opposite end. On the opposed or lower face surface 24b, groups of discrete electronic components 24e are mounted alignable with pockets 20e, 20f. Flexible circuit terminal pads 24m are also formed on face surface 24b.

Figure 19:
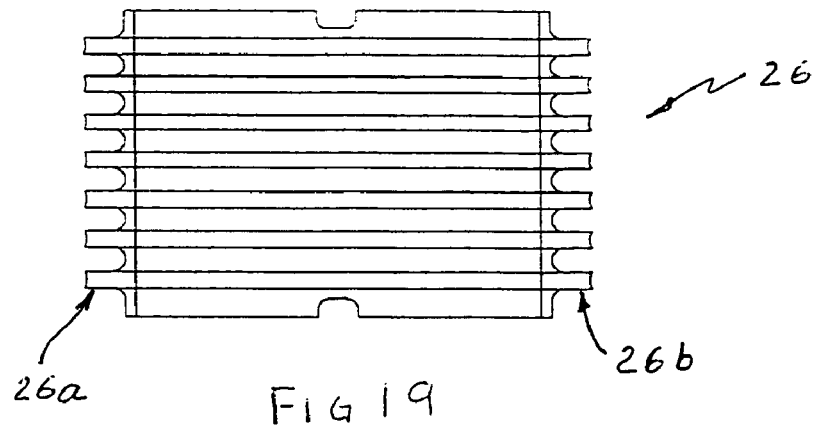
FIG. 19 is a top plan view of a flexible circuit board.

Flexible circuit board 26, FIG. 19, has terminals 26a, 26b disposed at respective opposite ends of the board. One set of terminals 26a, 26b are electrically connected to terminal pads 22m, preferably prior to mounting sense element pcb 22 to spacer/support member 20, and the other set of terminals 26a, 26b are connected to terminal pads 24m of contact pcb 24.

Sense element pcb 22 and spacer/support member 20 are then mounted on base 16 with the second set of guide pins received through alignment holes 22a of the circuit board and into alignment bores 16e of the base and fasteners, such as self-threading screws, are inserted through fastener holes 20h of the spacer/support member and 22g of sense element pcb 22. As seen in FIG. 3, ASIC U1 is received in recess 16f of the base with lower face surface 22e otherwise supported on and fixed to the upper surface 16b of base 16 thereby providing a secure environment for the wire bonding (not shown) of the sense element assembly strain gauges to the wire bond pads on sense element pcb 22. Another screw is received through an aperture 22k in board 22 and into a bore 16e of the base to provide a case ground connection.

Figure 20:
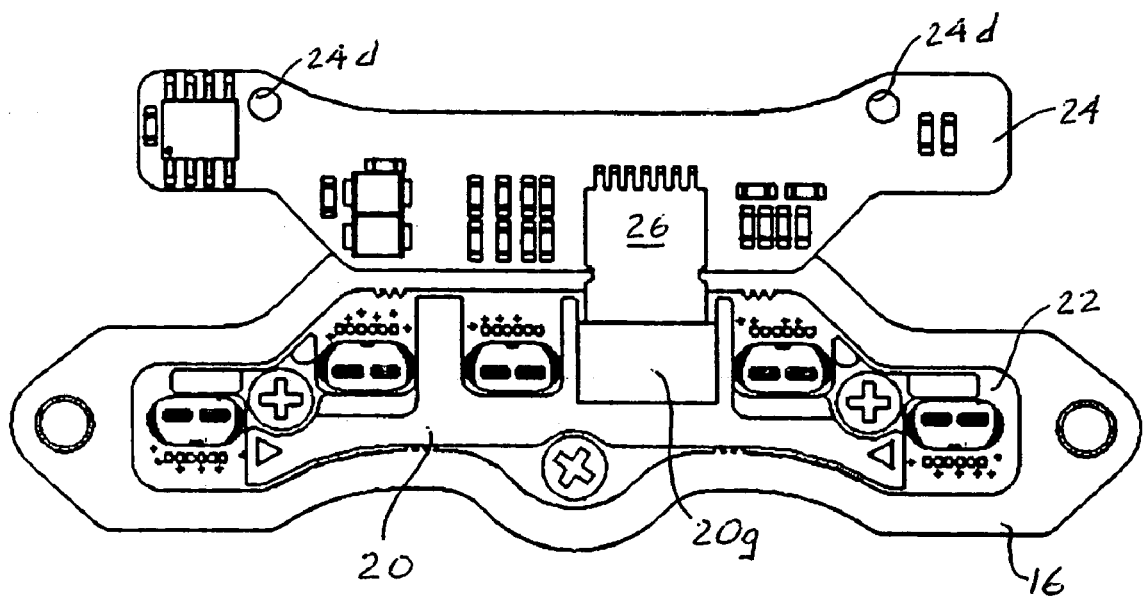
FIG. 20 is a top plan view showing the module partially assembled and without the cover.

With reference to FIG. 20, contact pcb 24 and flexible circuit board 26 are then turned over so that flexible circuit board forms a generally U-shaped configuration trained around shelf 20g and with the first set of guide posts received in guide holes 24d of printed circuit board 24.

Cover 18, FIGS. 1–3, is elongated, preferably formed of moldable plastic material, having a top wall 18a and a side wall 18b depending therefrom. A tapered post 18c depends downwardly from side wall 18b at each opposite end of the cover which is receivable in respective stepped bores 16d of base 16. Posts 18c are staked with the larger diameter portion providing a surface for the stake head to hold on to. A shroud 18d extends upwardly from an opening in top wall 18a aligned with the contact pads of contact pcb 24. The bottom surface of top wall 18a also has an oval shaped surface portion 18e at the bottom of shroud 18d aligned with and closely adjacent contact pcb 24. Additionally, a downwardly extending boss 18f is formed adjacent each opposite end of top wall 18a aligned with contact pcb 24. Both oval portion 18e and bosses 18f are preferably formed with a centered groove for receipt of adhesive (not shown). This adhesive can be cured before or after assembly. If cured before assembly the adhesive serves as a compliant gasket which is compressed against the contact pcb 24 when the cover is staked in place holding the contact pcb tightly in place. If the adhesive is cured after assembly the adhesive properties of the material will hold board 24 in place. This adhesive also provides a secondary seal between cover 18 and circuit board 24. Once the unit is installed in an HECU, the cover's shroud 18d interfaces with a pocket of sealing gel which then protects the contact pads form the environment through the connector shroud. The primary adhesive seal (not shown) is provided by adhesive placed on upper surface 16b of the base around the outer peripheral margin which cooperates with a cut away peripheral portion 18k on the inside of wall 18b of the cover.

While the preferred embodiment of the present invention has been disclosed in detail, it should be understood that various modifications may be adopted without departing from the spirit of the invention or scope of the appended claims.

What is claimed:

1. Multi-channel pressure sensing apparatus comprising:
an elongated base having opposed face surfaces and a plurality of sense element receiving bores formed between the opposed face surfaces, a plurality of guide holes and fixation bores formed in the base through one face surface,
a sense element received in each sense element receiving bore, each sense element having opposite ends with a bore extending from an opening at one end to a closed head at the opposite end, the closed head having an outer diaphragm surface, a strain gauge mounted on the outer diaphragm surface adjacent said one face surface of the base,
an electronic module assembly having an elongated, relatively rigid spacer/support member of electrically insulative material having upper and lower surfaces and having a plurality of pockets open to the upper and lower surfaces and to a side of the spacer, the spacer/support member having a first set of space apart guide posts extending upwardly from the spacer/support member and a second set of spaced apart guide posts extending downwardly from the spacer/support member, a relatively rigid, elongated contact printed circuit board (pcb) having circuit traces and having a guide hole formed therethrough for and alignable with each guide post of the first set, the contact pcb having opposed face surfaces with a plurality of contact pads on one face surface and a plurality of discrete electronic components mounted on the other face surface and positioned so that when the contact pcb is received on the upper face of the spacer/guide member with the guide posts received in respective guide holes, the discrete electronic components are received in the pockets formed in the spacer/support member, a relatively rigid, elongated sense element printed circuit board (pcb) having circuit traces and sense element wire bond pads and having a plurality of fixation holes formed therethrough and a guide hole formed therethrough and alignable with each guide post of the second set, the sense element pcb having opposed face surfaces with an opening therethrough for and alignable with each respective sense element and with the sense element wire bond pads on a first face surface for wire bond electrical connection with strain gauges of respective sense elements, the face surface of the sense element pcb on which the wire bond pads are disposed being received on the lower surface of the spacer with each guide post of the second set received through a respective guide hole of the sense element pcb and the sense element openings and sense element wire bond pads aligned with a pocket of the spacer; a flexible printed circuit board (pcb) having opposite end portions and a plurality of circuit traces, each end portion of the flexible pcb connected to a respective contact and sense element pcb with the circuit traces in electrical connection with circuit traces on the respective contact and sense element pcbs, the flexible pcb bent into a generally U-shaped configuration with the contact and sense element pcbs mounted on the spacer, the guide posts of the second set being received in respective guide holes in the said one face surface of the base and fasteners received through the fixation holes of the sense element pcb into the fixation bores of the base to rigidly attach the sense element pcb to the base and a cover received over the electronic module assembly onto the base and attached thereto, the cover having a shroud surrounded opening aligned with the contact pads of the contact pcb.

2. A multi-channel pressure sensing apparatus according to claim 1 in which the first and second set of guide posts form an interference fit with the respective guide holes.

3. A multi-channel pressure sensing apparatus according to claim 2 in which the first and second set of guide posts have a longitudinal axis, the outer configuration of the posts being generally triangular in a cross-section taken perpendicular to the longitudinal axis.

4. A multi-channel pressure sensing apparatus according to claim 1 further comprising a laterally extending shelf extending from the spacer/support member intermediate the upper and lower surfaces thereof, the shelf forming a guide way about which the flexible circuit extends.

5. A multi-channel pressure sensing apparatus according to claim 1 in which an ASIC receiving recess is formed through the said one face surface of the elongated base and an ASIC is mounted on the second face surface of the sense element pcb opposed to the face surface on which the wire bond pads are disposed, the ASIC received in the recess with the remainder of the sense element pcb board supported on the said one face surface of the elongated base.

6. A multi-channel pressure sensing apparatus according to claim 1 in which the material of the base is relatively softer than the material of the sense elements, the sense elements each formed with an annular radially extending flange having a diameter slightly larger than the diameter of the sense element receiving bores and an annular reduced diameter portion is formed in each sense element contiguous with the flange, the base material being swaged into the reduced diameter portion to form a liquid pressure seal.

7. Multi-channel pressure sensing apparatus comprising:
an elongated base having opposed face surfaces and a plurality of sense element receiving bores formed between the opposed face surfaces, a plurality of guide holes and fixation bores formed in the base through one face surface,
a sense element received in each sense element receiving bore, each sense element having opposite ends with a bore extending from an opening at one end to a closed head at the opposite end, the closed head having an outer diaphragm surface, a strain gauge mounted on the outer diameter surface adjacent said one face surface of the base,
an electronic module assembly having an elongated, relatively rigid spacer/support member of electrically insulative material having upper and lower surfaces and having a plurality of open pockets, the spacer/support member having a first set of space apart guide posts extending upwardly from the spacer/support member and a second set of spaced apart guide posts extending downwardly from the space/support member, a relatively rigid, elongated contact printed circuit board (pcb) having circuit traces and having a guide hole formed therethrough for and alignable with each guide post of the first set, the contact pcb having opposed face surfaces with a plurality of contact pads on one face surface, a relatively rigid, elongated sense element printed circuit board (pcb) having circuit traces and sense element wire bond pads and having a plurality of fixation holes formed therethrough and a guide hole formed therethrough and alignable with each guide post of the second set, the sense element pcb having opposed face surfaces with an opening therethrough for and alignable with each respective sense element and with the sense element wire bond pads on a first face surface for wire bond electrical connection with strain gauges of respective sense elements, the face surface of the sense element pcb on which the wire bond pads are disposed being received on the lower surface of the spacer with each guide post of the second set received through a respective guide hole of the sense element pcb and the sense element openings and sense element wire bonds aligned with a pocket of the spacer; a flexible printed circuit board (pcb) having opposite end portions and a plurality of circuit traces, each end portion of the flexible pcb connected to a respective contact and sense element pcb with the circuit traces in electrical connection with circuit traces on the respective contact and sense element pcbs, the flexible pcb bent into a generally U-shaped configuration with the contact and sense element pcbs mounted on the spacer, the guide posts of the second set being received in respective guide holes in the said one face surface of the base and fasteners received through the fixation holes of the sense element pcb into the fixation bores of the base to rigidly attach the sense element pcb to the base, and a cover received over the electronic module assembly into the base and attached thereto, the cover having a shroud surrounded opening aligned with the contact pads of the contact pcb.

\* \* \* \* \*